(12) United States Patent
Singhal et al.

(10) Patent No.: US 11,070,101 B2
(45) Date of Patent: Jul. 20, 2021

(54) METHOD AND APPARATUS FOR COOLING AN ROTOR ASSEMBLY

(71) Applicant: GE AVIATION SYSTEMS LLC, Grand Rapids, MI (US)

(72) Inventors: Sumit Singhal, Mason, OH (US); Hao Huang, Troy, OH (US)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 244 days.

(21) Appl. No.: 15/874,455

(22) Filed: Jan. 18, 2018

(65) Prior Publication Data

US 2019/0222079 A1 Jul. 18, 2019

(51) Int. Cl.
| | |
|---|---|
| *H02K 3/24* | (2006.01) |
| *H02K 19/22* | (2006.01) |
| *H02K 9/02* | (2006.01) |
| *H02K 7/18* | (2006.01) |
| *F01D 5/08* | (2006.01) |
| *F01D 15/10* | (2006.01) |

(52) U.S. Cl.
CPC ............ *H02K 3/24* (2013.01); *H02K 7/1823* (2013.01); *H02K 9/02* (2013.01); *H02K 19/22* (2013.01); *F01D 5/08* (2013.01); *F01D 15/10* (2013.01); *F05D 2220/76* (2013.01); *F05D 2240/24* (2013.01); *F05D 2250/11* (2013.01); *F05D 2260/22141* (2013.01)

(58) Field of Classification Search
CPC ............ H02K 3/24; H02K 1/32; H02K 1/325; H02K 1/20; H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22; H02K 9/24; H02K 9/26; H02K 9/28; F01D 5/08; F01D 15/10; F05D 2260/22141; F05D 2220/76; F05D 2240/24; F05D 2250/11
USPC .. 310/179, 180, 184, 52, 53, 54, 55, 56, 57, 310/58, 59, 60 R, 61, 60 A, 64, 65, 66
See application file for complete search history.

(56) References Cited

U.S. PATENT DOCUMENTS

| | | | | |
|---|---|---|---|---|
| 2,756,358 | A | * 7/1956 | Johnson | H02K 3/18 310/180 |
| 2,899,573 | A | 8/1959 | Wesoloski | |
| 3,091,710 | A | 5/1963 | Shartrand et al. | |
| 4,409,502 | A | * 10/1983 | McCabria | H02K 9/06 310/165 |

(Continued)

FOREIGN PATENT DOCUMENTS

CN 107465321 A 12/2017

OTHER PUBLICATIONS

Chinese Patent Office, Office Action re Corresponding Application No. 201910048134.3, dated Aug. 3, 2020, 9 pages, China.

*Primary Examiner* — Quyen P Leung
*Assistant Examiner* — Alexander A Singh
(74) *Attorney, Agent, or Firm* — McGarry Bair PC

(57) ABSTRACT

A method and apparatus for cooling a rotor assembly for an inside-out electric machine includes an annular rotor core defining a set of rotor posts, the core rotatable about an axis of rotation, a set of windings wound around the respective set of rotor posts, and a wedge disposed between adjacent sets of rotor windings.

19 Claims, 3 Drawing Sheets

(56) References Cited

U.S. PATENT DOCUMENTS

| | | | |
|---|---|---|---|
| 5,134,844 A | 8/1992 | Lee et al. | |
| 5,140,204 A | 8/1992 | Cashmore et al. | |
| 7,345,385 B2 | 3/2008 | Kreitzer | |
| 8,198,744 B2 | 6/2012 | Kern et al. | |
| 8,878,403 B2 | 11/2014 | Schwery et al. | |
| 9,030,074 B2 | 5/2015 | Coldwate et al. | |
| 10,243,436 B2 | 3/2019 | Park et al. | |
| 2003/0184180 A1* | 10/2003 | Doherty | H02K 3/527 310/214 |
| 2008/0143115 A1 | 6/2008 | Kern | |
| 2011/0148237 A1* | 6/2011 | Toot | H02K 16/02 310/114 |

* cited by examiner

METHOD AND APPARATUS FOR COOLING AN ROTOR ASSEMBLY

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines can have two or more spools, including a low pressure (LP) spool that provides a significant fraction of the overall propulsion system thrust, and a high pressure (HP) spool that drives one or more compressors and produces additional thrust by directing exhaust products in an aft direction. A triple spool gas turbine engine includes a third, intermediate pressure (IP) spool.

Gas turbine engines also usually power a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy needed to power accessories.

BRIEF DESCRIPTION OF THE INVENTION

In one aspect, the present disclosure relates to a rotor assembly for an inside-out electric machine including an annular rotor core defining a set of rotor posts, the core rotatable about an axis of rotation, a set of windings wound around the respective set of rotor posts, and a thermally conductive wedge disposed between adjacent sets of rotor windings having an inner surface defining a hollow cavity extending through the wedge in an axial direction. Heat from the set of rotor windings is thermally transferred to the inner surface of the wedge.

In another aspect, the present disclosure relates to a gas turbine engine, including a rotatable assembly having a fan section and a booster section, the rotatable assembly rotatable about an axis of rotation, at least one non-rotatable axial shaft, a booster cavity defined in a space between the booster section and the at least one non-rotatable axial shaft, and an inside-out electric machine disposed within the booster cavity. The inside-out electric machine further includes an annular rotor core rotationally connected with the rotatable assembly and defining a set of rotor posts, a set of rotor windings wound around the respective set of rotor posts, a thermally conductive wedge disposed between adjacent sets of rotor windings having an inner surface defining a hollow cavity extending through the wedge in an axial direction, and an annular stator assembly arranged concentrically within the rotor core. The booster cavity receives an airflow traversing through the hollow cavity of the wedge, and wherein heat from the set of rotor windings is thermally conducted to the airflow traversing the hollow cavity.

In yet another aspect, the present disclosure relates to a method of cooling a rotor assembly for an inside-out electric machine, the method including receiving an airflow within a booster section of a gas turbine engine along and through an axially-oriented hollow cavity of a thermally conductive wedge circumferentially spacing at least two sets of rotor windings of an annular rotor assembly rotatably arranged concentric to non-rotating stator assembly received within the rotor assembly. At least a first face of the wedge is in a thermally conductive relationship with a first set of adjacent rotor windings and a second face of the wedge is in a thermally conductive relationship with a second set of adjacent rotor windings, and wherein the airflow removes heat from the first and second sets of rotor windings.

DESCRIPTION OF EMBODIMENTS OF THE INVENTION

Figure 1:
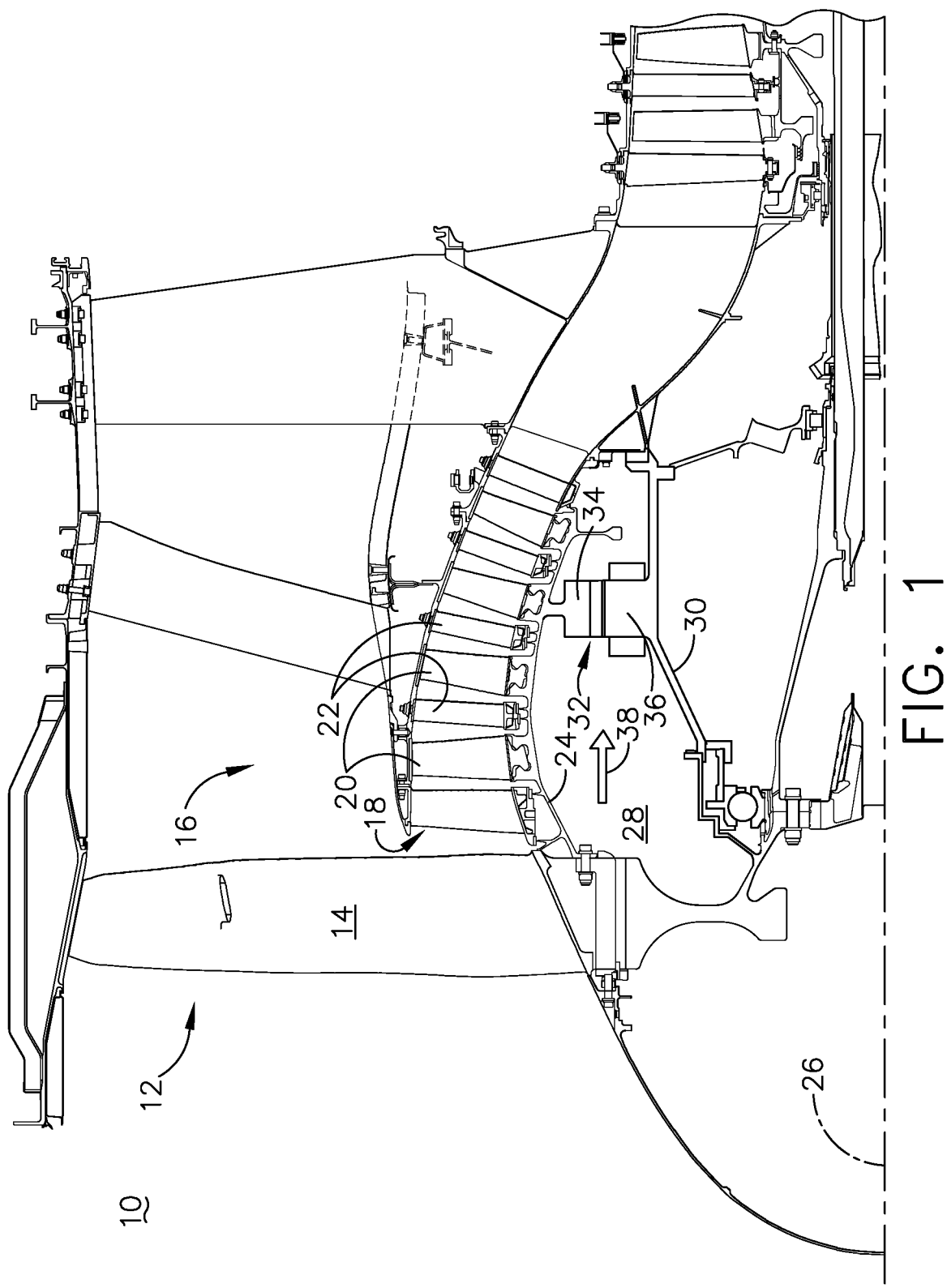
FIG. 1 is a cross-sectional view of a gas turbine engine having a generator, in accordance with various aspects described herein.

The described aspects of the present disclosure are directed to power extraction from an aircraft engine, and more particularly to a method and apparatus enables production of electrical power from a turbine engine, such as a gas turbine engine. It will be understood, however, that aspects of the disclosure are not so limited and has general application to power extraction in non-aircraft applications, such as other mobile applications and non-mobile industrial, commercial, and residential applications having a driving force or mechanism, such as a rotor.

In another non-limiting example, aspects of the disclosure can be implemented in any environment using an electric motor regardless of whether the electric motor provides a driving force or generates electricity. For purposes of this description, such an electric motor or generator will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

Additionally, while terms such as "voltage", "current", and "power" can be used herein, it will be evident to one skilled in the art that these terms can be interchangeable when describing aspects of the electrical circuit, or circuit operations. Further, while this description is primarily directed toward an aircraft environment, aspects of the disclosure are applicable in any environment using an electric machine. Thus, a brief summary of a contemplated environment should aid in a more complete understanding.

FIG. 1 illustrates a schematic cross-sectional view of a gas turbine engine 10. The gas turbine engine 10 can be a turbofan engine, such as a General Electric GEnx or CF6 series engine, commonly used in modern commercial and military aviation or it could be a variety of other known gas turbine engines such as a turboprop or turboshaft. The gas turbine engine 10 can include, in downstream serial flow relationship, a fan section 12 including a fan 14, and a booster section 16. The booster section 16 can include a set of booster turbine blades 18, including a first subset of rotatable turbine blades 20 and a second subset of non-rotatable turbine blades 22. Collectively, the fan section 12, fan 14, and at least the rotatable subset of booster turbine blades 20 can define a rotating assembly 24 of the gas turbine engine 10, and rotate or co-rotate relative to an axis of rotation 26.

The booster section 16 can define a cavity 28 between the set of booster turbine blades 18 and a non-rotating or stationary axial shaft 30 of the engine 10. In one non-limiting example, the non-rotating axial shaft 30 can be attached, fixed, coupled, mounted, or the like, to any suitable non-rotational structure or housing of the gas turbine engine 10.

An electrical machine, such as a generator 32 can be mounted inside the cavity 28 and adapted to extract electrical power from the mechanical rotation of the rotating assembly 24. The generator 32 can include any suitable configuration electric machine configuration, including but not limited to, a switched reluctance (SR) machine, induction machines, permanent magnet machines, or the like. As shown, the generator 32 can include a rotor assembly 34 and a stator assembly 36.

Aspects of the generator 32, the rotor assembly 34, and the stator assembly 36 can be adapted, arranged, or otherwise configured to employ an "inside-out" electric machine architecture. The "inside-out" machine architecture refers to an arrangement that is the reverse of a conventional generator configuration. In this sense, the term "inside-out" describes a rotor assembly 34 that is positioned on the radially-outer perimeter of the stator assembly 36 and rotates about the internal, fixed stator assembly 36 to generate electric power. Each of the rotor assembly 34 and the stator assembly 36 can be generally formed as annular structures arranged concentrically, with the stator assembly 36 within the rotor assembly 34.

In this sense, the rotor assembly 34 can be mounted or connected with the rotating assembly 24, or a component thereof, while the stator assembly 36 can be mounted in a non-rotating or fixed relationship relative to the gas turbine engine 10, such as fixed to the axial shaft 30. Non-limiting aspects of the disclosure can be included wherein the rotor assembly 34 can co-rotate with the rotating assembly 24, or can rotate in a rationed relationship with the rotating assembly 24, for example, by way of a gearbox.

The cavity 28 can further be configured, adapted, or the like to receive an airflow (illustrated schematically as arrow 38) during operations. In one non-limiting example, the airflow 38 can be an ambient airflow, and can be further received by the generator 32.

Figure 2:
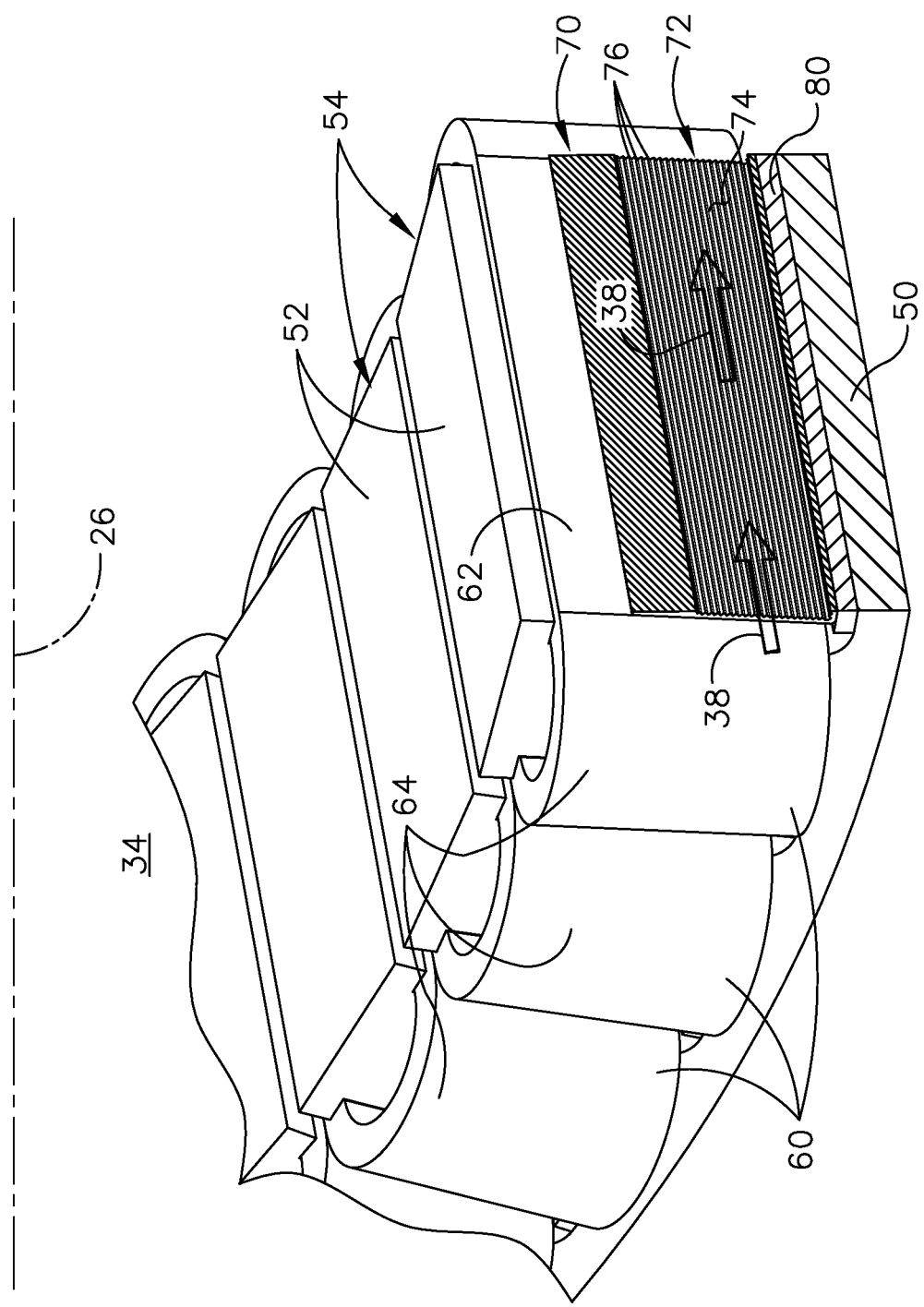
FIG. 2 is an isometric sectional view of a rotor of the generator of FIG. 1, in accordance with various aspects described herein.

Turning now to FIG. 2, the rotor assembly 34 is described in greater detail. As shown, the rotor assembly 34 can include a set of rotor teeth of posts 52 extending radially inward toward the axis of rotation 26 from a rotor core 50 or rotor base. At least one rotor pole 54 or set of rotor poles 54 can be formed by a core 50 with a post 52 and conductive wire wound about the post 52 to form a rotor winding 60. In this instance each in a set of rotor windings 60 can include a first winding portion 62 extending in an axial direction along the rotor post 52, between opposing spaced axial ends of the post 52. In one non-limiting aspect, the first winding portion 62 can extend in a direction parallel with the axis of rotation 26. Each in the set of rotor windings 60 can also include wire wound about at least one axial end of the rotor post 52, forming a second winding portion 64 extending beyond the at least one axial end, such as an end turn. In another non-limiting example, the set of rotor windings 60, or a portion 62, 64 thereof, can include or be exteriorly layered with, wrapped with, or coated with an electrically non-conductive material to prevent or inhibit electrically conductive contact between adjacent rotor windings 60, or between the rotor windings 60 and the rotor core 50, set of posts 52, or the like.

Non-limiting aspects of the rotor assembly 24 can further include a wedge 70 positioned between adjacent rotor windings 60. As shown in FIG. 2 and the axial cross-sectional view of FIG. 3, the wedge 70 can be shaped, contoured, or otherwise adapted to be received between adjacent rotor windings 60, between adjacent posts 52, or between adjacent poles 54. In one non-limiting example, the wedge 70 can include a generally triangular cross-section in shape, however alternative geometric cross-sections can be included. In one non-limiting aspect, the wedge 70 can be configured to extending in an axial direction parallel with the first winding portion 62. In another non-limiting instance, the wedge 70 can extend axially between the opposing axial ends of the set of posts 52, or in a corresponding axial length matching the first winding portion 62. Alternative aspects can include varying axial lengths, including by not limited to longer or shorter axial lengths, relative to the set of posts 52, first winding portion 62, or the like. The wedge 70 can further be adapted, formed, configured, or the like, to at least partially separate or circumferentially-space adjacent sets of windings 60 from each other. Non-limiting aspects of the disclosure can further include a cap 80 positioned radially outward from wedge 70, for example, between the wedge 70 and the rotor core 50, and be adapted or configured to prevent, inhibit, or counter radial movement of the wedge 70 during rotational movement of the rotor assembly 34. In one non-limiting example, the wedge 70 can be formed, configured, created, or otherwise developed and implemented with additive manufacturing technologies.

In one non-limiting aspect, the wedge 70 can include a thermally conductive composition, such as metal. In another non-limiting aspect, the wedge 70 can include an electrically non-conductive composition, to prevent conductive connections between adjacent sets of rotor windings 60. The wedge 70 can further include an inner surface 72 defining an internal or hollow cavity 74 of the wedge 70. The inner surface 72 or the hollow cavity 74 can extend in an axial direction, parallel with the first winding portion 62, and open at each axial end of the wedge 70. In this sense, the hollow cavity 74 can include a through opening of the wedge 70, allowing an airflow to extend along and through the full axial length of the wedge 70. In this sense, the hollow cavity 74 can act as a cooling conduit for passing a fluid coolant flow, including, but not limited to an ambient airflow 38.

Figure 3:
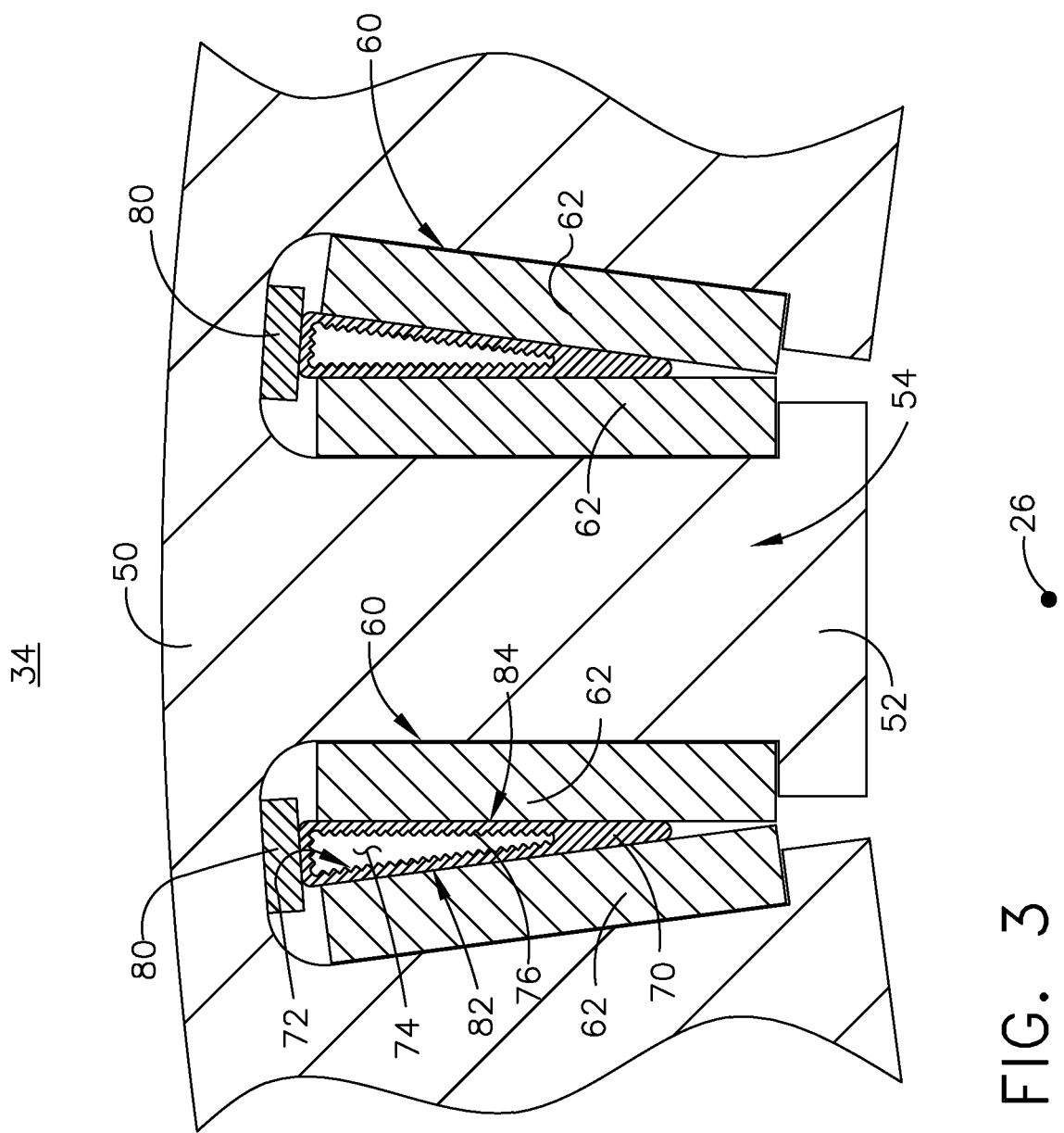
FIG. 3 is a cross-sectional view of the rotor of FIG. 2, taken along line a view parallel with the axis of rotation, in accordance with various aspects described herein.

During generator 32 operations the set of rotor poles 54 can generate a set of magnetic fields relative to the stator assembly 36 (not shown in FIGS. 2 and 3). The interaction of the set or rotor pole 54 magnetic fields and current-carrying set of rotor windings 60 relative to the stator assembly 36 can, in turn, to generate electrical power in the stator assembly 36 to be supplied to, or to energize, one or more electrical loads. In this sense, the electrical generator 32 can supply or provide a primary or supplemental source of electrical power, such as in addition to the traditional sources of electrical power in gas turbine engines 10 (i.e., electrical generators driven by one or more booster section 16 turbines).

The set of rotor windings 60 will generate heat in response to current conduction due to resistive heating, also known as Joule heating or ohmic heating. Aspects of the disclosure can be included wherein the wedge 70 can be in a thermally-conductive relationship with adjacent sets of rotor windings 60, such as in direct thermal contact with the first winding portion 64 of adjacent windings 60. As shown, non-limiting aspects of the disclosure can be included wherein the wedge 70 includes a first exterior face 82 in a thermally conductive relationship with a first set of adjacent windings 60 and a second exterior face 84 in a thermally conductive relationship with a second set of adjacent windings 60, different from the first set of adjacent windings 60.

In this configuration or adaptation, heat generated in the set or rotor windings 60 can be thermally conducted away from the set of windings 60 to the wedge 70, and throughout the wedge 70. When the hollow cavity 74 of the wedge 70 is exposed to an airflow, such as the airflow 38 of the booster section cavity 28, heat conducted to or stored in or at the wedge 70 can further be conductively, convectively, or radiatively transferred from the wedge 70 to the airflow 38. In this sense, the wedge 70 enables or provides for a thermally conductive cooling of the set of rotor windings 60 by transferring heat from the set of windings 60 to an airflow 38 traversing axially through the wedge hollow cavity 74.

Further configuration or adaption of the wedge 70 can improve or increase the cooling or heat transfer. For instance, non-limiting aspects of the inner surface 72 can be conformed, adapted, shaped, or otherwise configured to increase the amount of surface area exposed to the hollow cavity 74 or airflow 38, or to include additional heat-dissipating surfaces. As shown, one non-limiting example of the inner surface 72 can include a set of thermal fins 76 or heat fins to facilitate increase or improved thermal transfer, although additional inner surface 72 configurations can be included. In another non-limiting configuration, the set of thermal fins 76 can be oriented in parallel with the axis of rotation 26, however additional orientations can be included.

Thus, as described herein, aspects of the disclosure can include a method of cooling a rotor assembly 34 for an inside-out electric machine or generator 32. The method can include receiving a fluid coolant flow, such as an ambient airflow 38, within a hollow cavity 74 of a wedge 70 positioned between adjacent sets of rotor windings 60. In another non-limiting example, the method can include receiving the airflow 38 within a booster section 16 of a gas turbine engine 10 along and through an axially-oriented hollow cavity 74 of a thermally conductive wedge 70 circumferentially spacing at least two sets of rotor windings 60 of an annular rotor assembly 34 rotatably arranged concentric to non-rotating stator assembly 36 received within the rotor assembly 34.

Many other possible aspects and configurations in addition to that shown in the above figures are contemplated by the present disclosure. For example, one aspect of the disclosure contemplates a cooling cavity of the wedge that extend along alternative portions or lengths of the set of rotor windings 106. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

The aspects disclosed herein provide method and apparatus for cooling a rotor assembly or a set of rotor windings during inside-out electric machine operations (e.g. motor or generator operations). One advantage that may be realized in the above aspects is that the above described aspects have significantly improved thermal conduction to remove heat from the rotor assembly or set of rotor windings. The improved thermal conductivity between the rotor windings and the hollow cavity or cooling conduits provide for heat removal in a much more effective fashion from the windings. Another advantage of the above aspects is that a higher level of power generation may be achieved without having to use a wet-cavity configuration, or coolant liquid configuration, due to the improved heat removal of the set of rotor windings. The unique inside-out configuration of the generator within the booster cavity makes dissipating heat generated in the set of windings by alternative means, such as by way of liquid coolant or cooling oil, difficult to accomplish due to the rotating configuration within the engine.

The increased thermal dissipation of the rotor assembly allows for a higher speed rotation or high power generation, which may otherwise generate too much heat. The higher speed rotation may result in improved power generation or improved generator efficiency without increasing generator size. Reduced thermal losses in the electric machine allow for greater efficiency and greater power density of the generator.

Additionally, the positioning of the "inside-out" generator in the booster cavity allows the extraction of power from the rotating assembly, with minimal effect on the gas turbine engine geometry, and minimal obstruction to air flow paths.

When designing aircraft components, important factors to address are size, weight, and reliability. The above described rotor assembly has a decreased number of parts (due to the absence of traditional coolant flow), making the complete system inherently more reliable. This results in possibly a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for an inside-out electric machine comprising:
    an annular rotor core defining a set of rotor posts, the annular rotor core rotatable about an axis of rotation;
    a set of rotor windings wound around the respective set of rotor posts; and
    a thermally conductive wedge disposed between adjacent rotor windings of the set of rotor windings, the thermally conductive wedge defining a first distal end and a second distal end, spaced from the first distal end and having an inner surface defining a hollow cavity extending through the thermally conductive wedge in an axial direction between the first distal end and the second distal end;
    a cap disposed entirely within the rotor core and fully enclosed thereby, the cap positioned radially outward from the thermally conductive wedge and configured to prevent a radial movement of the thermally conductive wedge during a rotational movement of the rotor assembly; and
    wherein the thermally conductive wedge receives an airflow at the first distal end, through the entire hollow cavity to the second distal end and heat from the set of rotor windings is thermally transferred to the inner surface of the thermally conductive wedge and the airflow therein.

2. The rotor assembly of claim 1 wherein the rotor assembly is further disposed within a booster cavity of a gas turbine engine.

3. The rotor assembly of claim 2 wherein the rotor assembly is rotationally connected with a turbine engine rotating assembly.

4. The rotor assembly of claim 1 wherein the airflow is ambient air.

5. The rotor assembly of claim 1 wherein the thermally conductive wedge has a geometric cross section in an axial direction.

6. The rotor assembly of claim 5 wherein the thermally conductive wedge has a triangular cross section in the axial direction.

7. The rotor assembly of claim 1 wherein the inner surface includes additional heat-dissipating surfaces.

8. The rotor assembly of claim 7 wherein the additional heat-dissipating surfaces are heat fins.

9. The rotor assembly of claim 8 wherein the heat fins are oriented in parallel with the axis of rotation.

10. The rotor assembly of claim 1 wherein the thermally conductive wedge circumferentially spaces a first set of windings from an adjacent second set of windings.

11. The rotor assembly of claim 10 wherein the thermally conductive wedge comprises a first face in a thermally conductive relationship with the first set of windings and a second face in a thermally conductive relationship with the second set of windings.

12. A gas turbine engine, comprising:
    a rotatable assembly having a fan section and a booster section, the rotatable assembly rotatable about an axis of rotation;
    at least one non-rotatable axial shaft;
    a booster cavity defined in a space between the booster section and the at least one non-rotatable axial shaft; and
    an inside-out electric machine disposed within the booster cavity, and further comprising:
        an annular rotor core rotationally connected with the rotatable assembly and defining a set of rotor posts;
        a set of rotor windings wound around the respective set of rotor posts;
        a thermally conductive wedge disposed between adjacent rotor windings of the set of rotor windings, the thermally conductive wedge defining a first distal end and a second distal end spaced from the first distal end, and having an inner surface defining a hollow cavity extending through the thermally conductive wedge in an axial direction between the first distal end and the second distal end;
        a cap disposed entirely within the rotor core and fully enclosed thereby, the cap positioned radially outward from the thermally conductive wedge and configured to prevent a radial movement of the thermally conductive wedge during a rotational movement of the rotatable assembly; and
        an annular stator assembly arranged concentrically within the rotor core; and
    wherein the booster cavity receives an airflow traversing the first distal end, through the entire hollow cavity to the second distal end of the thermally conductive wedge, and wherein heat from the set of rotor windings is thermally conducted to the airflow traversing the entire hollow cavity and the airflow therein.

13. The gas turbine engine of claim 12 wherein the airflow is ambient air.

14. The gas turbine engine of claim 12 wherein the thermally conductive wedge has a geometric cross section in an axial direction.

15. The gas turbine engine of claim 14 wherein the thermally conductive wedge has a triangular cross section in the axial direction.

16. The gas turbine engine of claim 12 wherein the inner surface includes additional heat-dissipating surfaces.

17. The gas turbine engine of claim 16 wherein the additional heat-dissipating surfaces are heat fins oriented in parallel with the axis of rotation.

18. The gas turbine engine of claim 12 wherein the thermally conductive wedge comprises a first face in a thermally conductive relationship with a first set of windings and a second face in a thermally conductive relationship with a second set of windings.

19. A method of cooling a rotor assembly for an inside-out electric machine, the method comprising:
receiving an airflow within a booster section of a gas turbine engine along and through an axially-oriented hollow cavity of a thermally conductive wedge circumferentially spacing at least two sets of rotor windings of an annular rotor assembly rotatably arranged concentric to non-rotating stator assembly received within the rotor assembly, the entire airflow through the hollow cavity flowing from a first distal end of the thermally conductive wedge to a second distal end of the thermally conductive wedge; and
wherein the at least a first face of the thermally conductive wedge is in a thermally conductive relationship with a first set of adjacent rotor windings and a second face of the thermally conductive wedge is in a thermally conductive relationship with a second set of adjacent rotor windings, wherein a cap is disposed entirely within the rotor assembly and fully enclosed thereby, the cap positioned radially outward from the thermally conductive wedge and configured to prevent a radial movement of the thermally conductive wedge during a rotational movement of the rotor assembly, and wherein the airflow removes heat from the first and second sets of rotor windings.

* * * * *